United States Patent
Dawson et al.

(10) Patent No.: US 10,513,170 B1
(45) Date of Patent: Dec. 24, 2019

(54) ERGONOMIC VEHICLE BATTERY RETENTION SYSTEM FOR LIMITED PACKAGING SPACES

(71) Applicant: GM Global Technology Operations LLC, Detroit, MI (US)

(72) Inventors: Mark S. Dawson, Royal Oak, MI (US); Brian J. Zawadzki, Washington, MI (US); Catherine L. Carrigan, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/252,914

(22) Filed: Jan. 21, 2019

(51) Int. Cl.
*B60K 1/04* (2019.01)
*H01M 2/10* (2006.01)
*B60L 50/60* (2019.01)

(52) U.S. Cl.
CPC ............... *B60K 1/04* (2013.01); *B60L 50/66* (2019.02); *H01M 2/1077* (2013.01); *H01M 2/1083* (2013.01); *B60K 2001/0422* (2013.01); *H01M 2220/20* (2013.01)

(58) Field of Classification Search
CPC ............. B60K 1/04; B60K 2001/0455; B60K 2001/0422; B60K 2001/0466; B60K 2001/0494; B60L 50/66; B60L 50/50; B60L 50/60; H01M 2/1077; H01M 2/1083; H01M 2220/20
USPC ........................................................ 180/68.5
See application file for complete search history.

(56) References Cited

U.S. PATENT DOCUMENTS

| 4,682,751 A * | 7/1987 | Tamas | H01M 2/1083 |
| | | | 180/68.5 |
| 6,161,810 A * | 12/2000 | Crow | H01M 2/1083 |
| | | | 180/68.5 |
| 9,896,050 B2 * | 2/2018 | Paproth | B60R 16/04 |

* cited by examiner

*Primary Examiner* — John D Walters

(57) ABSTRACT

A battery retention system includes a retention surface, a retention clip connected to the retention surface. First and second side brackets are also connected to the retention surface, wherein each side bracket includes a primary ramp facing the retention clip. The battery retention system also includes a retention rod including a first slide, a second slide, and an elongated member extending between the first slide and the second slide. The first and second slides are configured to slidingly contact the first and second primary ramps, respectively. The battery retention system further includes first and second mechanical fasteners configured to engage the first and second slides, respectively, with the first and second side brackets, respectively.

20 Claims, 7 Drawing Sheets

ERGONOMIC VEHICLE BATTERY RETENTION SYSTEM FOR LIMITED PACKAGING SPACES

INTRODUCTION

The present disclosure relates to a system for the ergonomic placement and retention of a vehicle battery in a limited packaging space.

Vehicles include one or more batteries as a component of the electrical system. For example, a battery may supply power to the starter to start the vehicle and provide power to a number of accessories, such as interior lighting, exterior lighting, ventilation and entertainment systems, when the engine is not running or cannot fulfill power demand. The battery may then be charged by the alternator while the engine is running.

Vehicle batteries may be placed in a number of locations within a vehicle. Batteries are often positioned in the engine compartment. Alternatively or additionally, batteries may be placed in the passenger compartment or luggage compartment. Depending on the size of a battery, placement of the battery may be facilitated by an assistive device. Batteries may be held in place in the vehicle by a clamp or hold down, which passes over the battery. Alternatively or additionally, a retention chuck is engaged with clamping surfaces provided at the base of multiple sides of the battery and is screwed in place.

Thus, while current systems achieve their intended purpose, there is a need for a new and improved system for the ergonomic placement and retention of a vehicle battery in a limited packaging space.

SUMMARY

According to several aspects, a battery retention system includes a retention surface and a retention clip connected to the retention surface. The battery retention system also includes a first side bracket connected to the retention surface, wherein the first side bracket includes a first primary ramp facing the retention clip, and a second side bracket connected to the retention surface, wherein the second side bracket includes a second primary ramp facing the retention clip. The battery retention system further includes a retention rod including a first slide, a second slide, and an elongated member extending between the first slide and the second slide. The first slide is configured to slidingly contact the first primary ramp and the second slide is configured to slidingly contact the second primary ramp. The battery retention system yet further includes a first mechanical fastener configured to engage the first slide with the first side bracket and a second mechanical fastener configured to engage the second slide with the second side bracket.

In an additional aspect of the present disclosure, the retention surface includes a floorboard.

In an additional aspect of the present disclosure, the floorboard is located in a vehicle.

In an additional aspect of the present disclosure, the battery retention system further includes a retention plate affixed to the elongated member.

In an additional aspect of the present disclosure, the retention rod includes a first slotted arm connecting the first slide to the retention rod and the retention rod includes a second slotted arm connecting the second slide to the second slotted arm, wherein the first slotted arm defines a first slot and the second slotted arm defines a second slot.

In an additional aspect of the present disclosure, the first mechanical fastener engages the first slot and the second mechanical fastener engages the second slot.

In an additional aspect of the present disclosure, the first side bracket includes a first upper surface spaced from the retention surface, wherein the first mechanical fastener extends from the first upper surface, and the second side bracket includes a second upper surface spaced from the retention surface, wherein the second mechanical fastener extends from the second upper surface.

In an additional aspect of the present disclosure, the first side bracket includes a first secondary ramp and the second side bracket includes a second secondary ramp, wherein the first secondary ramp faces the second secondary ramp.

In an additional aspect of the present disclosure, the retention clip includes a first end and a second end, and the first side bracket is located proximal to the first end and the second side bracket is located proximal to the second end.

According to several aspects, a vehicle includes a retention surface and a retention clip connected to the retention surface. In addition, the vehicle includes a first side bracket connected to the retention surface, wherein the first side bracket includes a first primary ramp facing the retention clip, and a second side bracket connected to the retention surface, wherein the second side bracket includes a secondary primary ramp facing the retention clip. The vehicle also includes, a battery sitting on the retention surface between the first side bracket and the second side bracket, the battery including a clamping surface, engaged by the retention clip. The vehicle further includes a retention rod. The retention rod includes a first slide, wherein the slide is configured to slidingly contact the first primary ramp, a second slide, wherein the second slide is configured to slidingly contact the second primary ramp, and an elongated arm extending between the first slide and the second slide, wherein the elongated arm is positioned adjacent to the battery opposing the clamping surface. The vehicle further includes a first mechanical fastener configured to engage the first slide with the first side bracket and a second mechanical fastener configured to engage the second slide with the second side bracket.

In an additional aspect of the present disclosure, the retention surface is a floorboard.

In an additional aspect of the present disclosure, the vehicle includes a vehicle frame, a passenger compartment defined by the vehicle frame, and two cross-members spanning the passenger compartment wherein the battery sits between the at least-two cross-members.

In an additional aspect of the present disclosure, a passenger seat is connected to the two cross-members and positioned over the battery.

In an additional aspect of the present disclosure, the vehicle includes a retention plate retained between the elongated arm and the battery.

In an additional aspect of the present disclosure, the battery includes an indent and the retention plate conforms to the indent of the battery.

In an additional aspect of the present disclosure, the first side bracket includes a first upper surface and the second side bracket includes a second upper surface.

In an additional aspect of the present disclosure, the first mechanical fastener extends from the first upper surface and the second mechanical fastener extends from the second upper surface.

In an additional aspect of the present disclosure, the first side bracket includes a first secondary ramp, the second side bracket includes a second secondary ramp, and the first and second secondary ramps face the battery.

According to several aspects, a method of locating a battery in a vehicle includes providing a retention surface, the retention surface including a retention clip connected to the retention surface, a first side bracket including a first primary ramp connected to the retention surface, and a second side bracket including a second primary ramp connected to the retention surface. The method further includes placing a battery on the retention surface between the first side bracket and the second side bracket, the battery including a clamping surface located adjacent to the retention clip. The method yet further includes positioning a retention rod adjacent to the battery opposing the retention clip, wherein the retention rod includes a first slide and a second slide and the first slide is configured to slidingly contact the first primary ramp and the second slide is configured to slidingly contact the second primary ramp. In addition, the method includes mechanically fastening the first slide to the first side bracket, mechanically fastening the second slide to the second side bracket, drawing the first slide down the first primary ramp, drawing the second slide down the second primary ramp, and engaging the clamping surface with the retention clip.

In an additional aspect of the present disclosure, placing the battery on the retention surface includes locating the battery between the first side bracket and the second side bracket.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
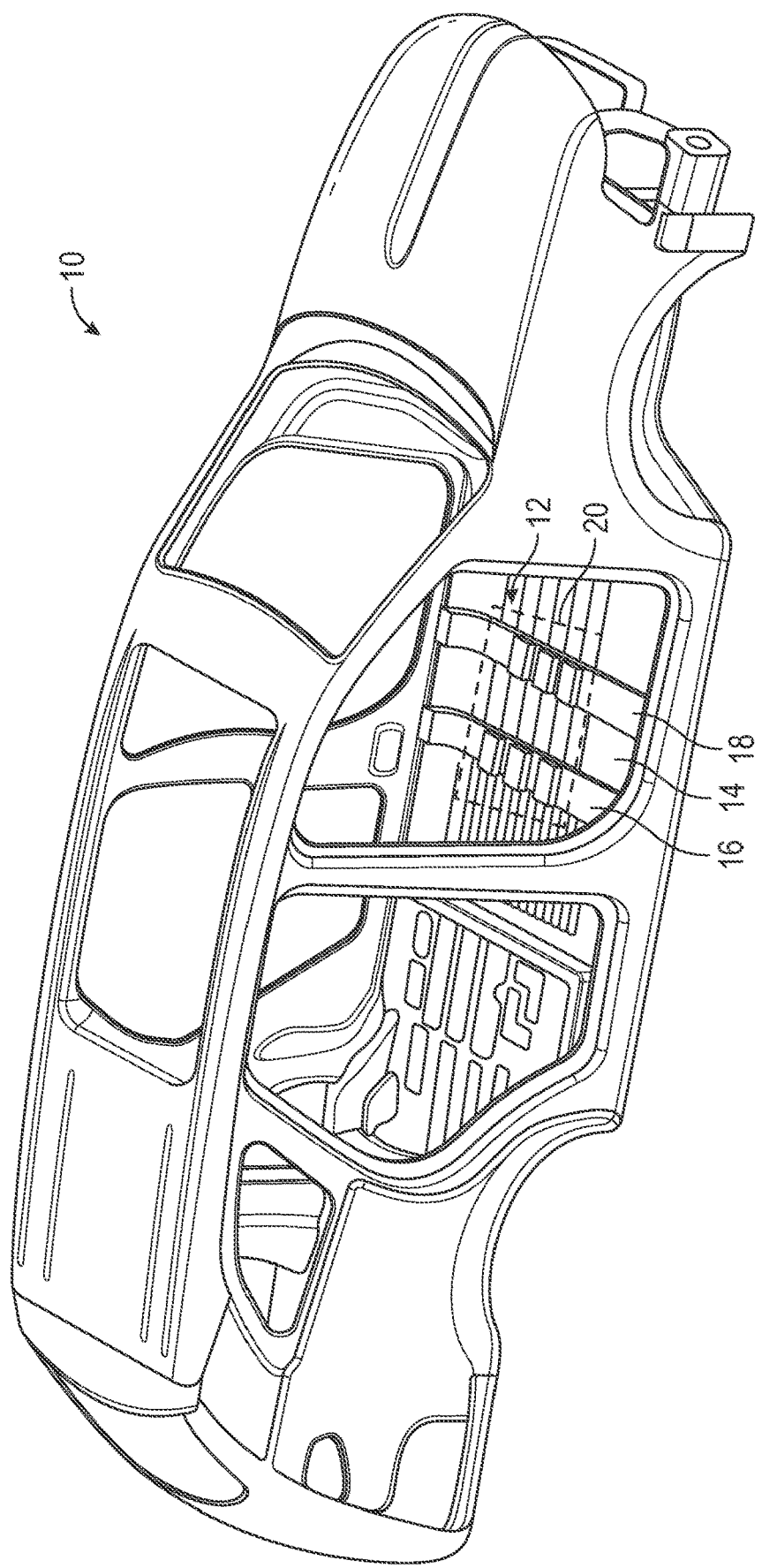
FIG. 1 illustrates a vehicle frame according to an exemplary embodiment.

The following description is merely exemplary in nature and is not intended to limit the present disclosure, application, or uses.

The terms "forward:", "front", "rear", "inner", "inwardly", "outer", "outwardly", "above", and "below" are terms used relative to the orientation of the motor vehicle as shown in the drawings of the present application. Thus, "front" or "forward" refers to a direction toward a front of a motor vehicle, "rear" refers to a direction toward a rear of a motor vehicle, "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle.

Additionally, in the claims and specification, certain elements are designated as "first", "second", and "primary", "secondary". These are arbitrary designations intended to be consistent only in the section in which they appear, i.e., the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, or function.

The present disclosure is directed to an ergonomic vehicle battery retention system and, in aspects, an ergonomic vehicle battery retention system for limited packaging spaces. Ergonomic is understood herein as relating to or being design for relative improvements in efficiency, discomfort or both in the working environment, including in environments where a battery may be installed or replaced. Packaging spaces are understood herein a locations where the battery may be located in the vehicle. Limited packaging spaces are understood as locations in the vehicle where the battery is located that are relatively confined, such as within the passenger compartment of the vehicle, between crossbars, under crossbars of the vehicle, within storage compartments in the vehicle, and combinations thereof. The battery includes any automotive battery, such as a starter battery, a micro belted alternator starter (microBAS) battery, or other batteries for use with various components of the electrical system. It is noted that in aspects, the retention system is suited for batteries that do not include a clamping surface around the perimeter of the battery base as well as for batteries that cannot be strapped in by a retention strap that passes over the top of the battery.

FIG. 1 illustrates a vehicle frame 10. The vehicle frame 10 defines a passenger compartment 12 within the vehicle frame 10. At the bottom of the vehicle frame 10 is the floorboard 14. The floorboard 14 provides a retention surface for a battery. Alternatively, other retention surfaces may be utilized, such as in a storage compartment of the vehicle or in the engine compartment. In multiple aspects, a battery 26 (illustrated in FIG. 2) is stored in the forward portion of the passenger compartment 12 between two cross-bars 16, 18 in the region of dotted box 20.

Figure 2:
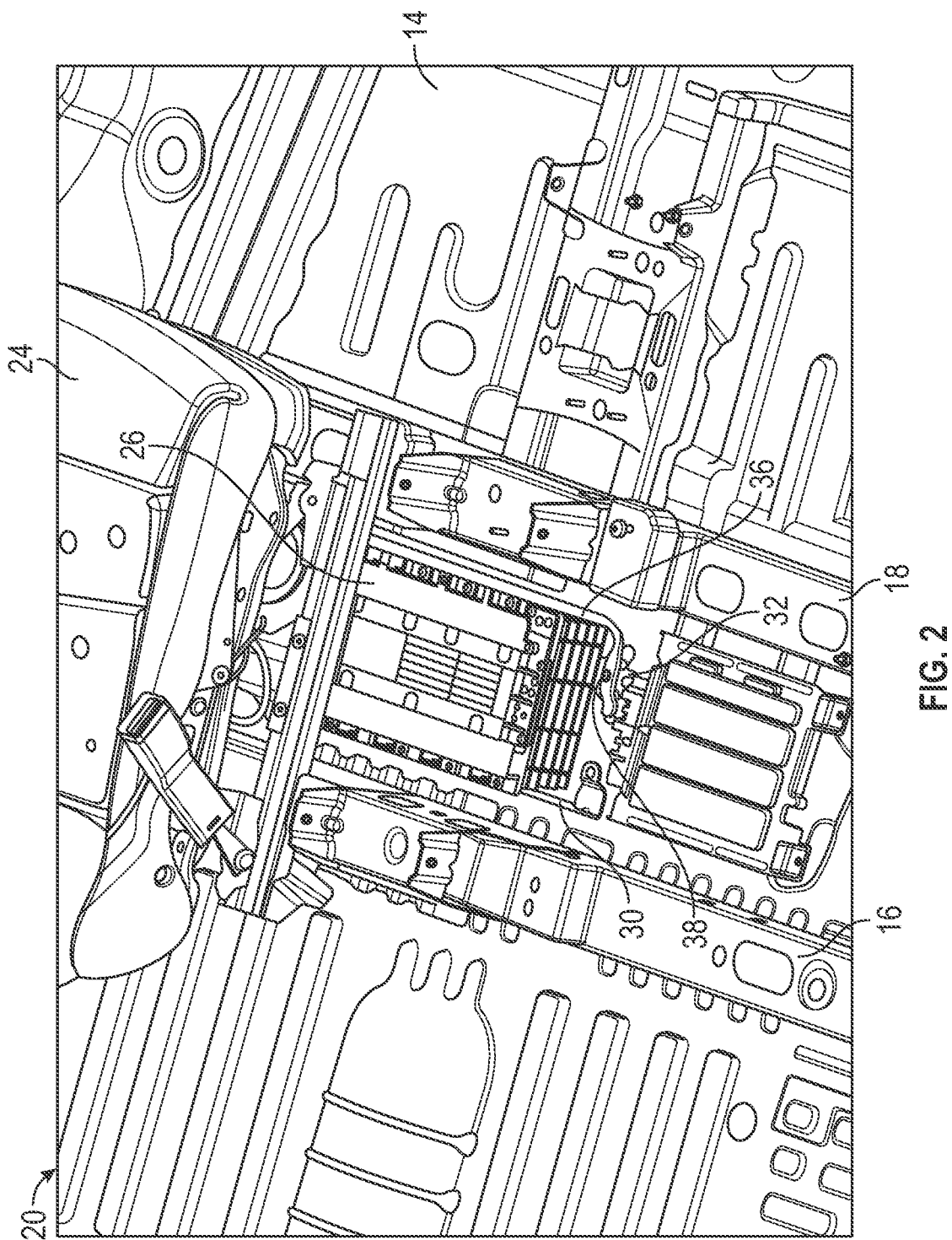
FIG. 2 illustrates a battery positioned on the vehicle frame under a passenger seat in location A of FIG. 1, according to an exemplary embodiment.

FIG. 2 illustrates the region of dotted box 20 of FIG. 1. In the aspects illustrated, a passenger seat 24 is positioned over the battery 26. As can be seen in the figure, the battery 26 rests between the two cross-bars 16, 18 upon which the passenger seat 24 is mounted. In aspects, the retention system generally includes the retention surface, i.e., the floorboard 14, a retention clip 30 connected to the floorboard 14, side brackets 32 (the second side bracket 34 is not visible in this view) also connected to the floorboard 14, a retention rod 36, and mechanical fasteners 38 (the second mechanical fastener 40 is not visible in this view).

Figure 3:
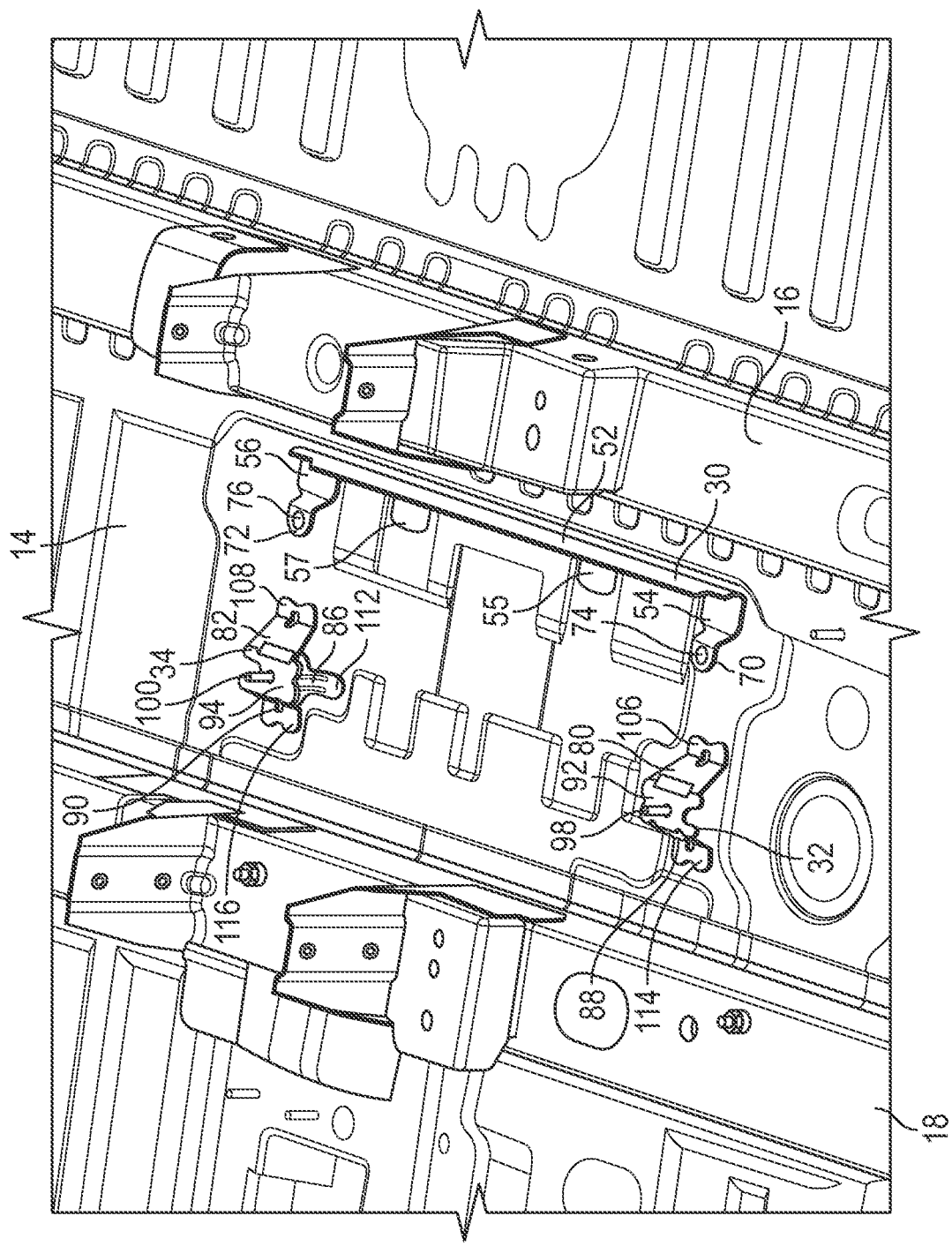
FIG. 3 illustrates a perspective view of the side brackets relative to the retention clip on the retention surface according to an exemplary embodiment.

Beginning with the retention clip 30, FIG. 3 depicts a perspective view of the retention clip 30 and the side brackets 32, 34. The retention clip 30 engages a clamping surface 44 provided on, or extending from, the rear side 46 of the battery 26, near the base 48 of the battery 26. In aspects, the retention clip 30 is a metal or a metal alloy. As illustrated, the retention clip 30 includes an elongate structure main body 52. In aspects, the retention clip 30 also includes end portions 54, 56 at either end of the retention clip 30.

Figure 4:
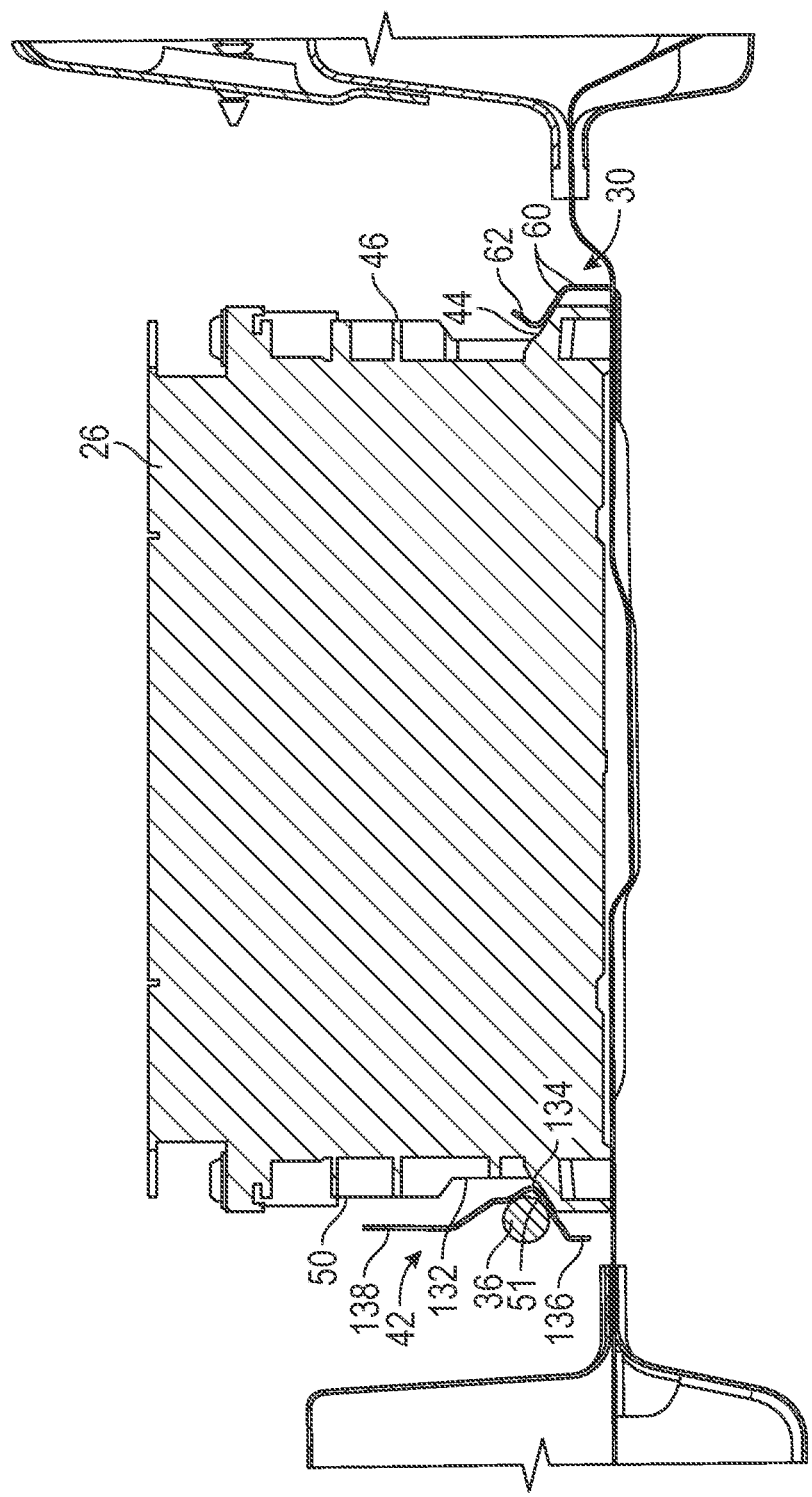
FIG. 4 illustrates a cross-sectional view of the retention rod, the retention plate, and battery, as assembled.

FIG. 4 illustrates a cross-sectional view of the retention clip 30, the retention rod 36 and battery 26, in the installed position. The main body 52 of the retention clip 30 includes a first portion 60 that exhibits a geometry complimentary to the clamping surface 44 of the battery 26. In aspects, there is an interference fit between at least a portion of the clamping surface 44 and the first portion 60 of the retention clip 30 main body 52, which provides a press fit or a friction fit between the clamping surface 44 and the first portion 60 of the retention clip 30.

The retention clip 30 also includes a second portion 62 that bends away from the clamping surface 44 and rear side 46 of the battery 26. This second portion 62 assists in disengaging the retention clip 30 from the battery 26 when, for example, the battery 26 needs to be replaced. Pressing down on the second portion 62 and pulling the second portion 62 away from the clamping surface 44 disengages the retention clip 30 from the clamping surface 44 of the battery 26.

Figure 5:
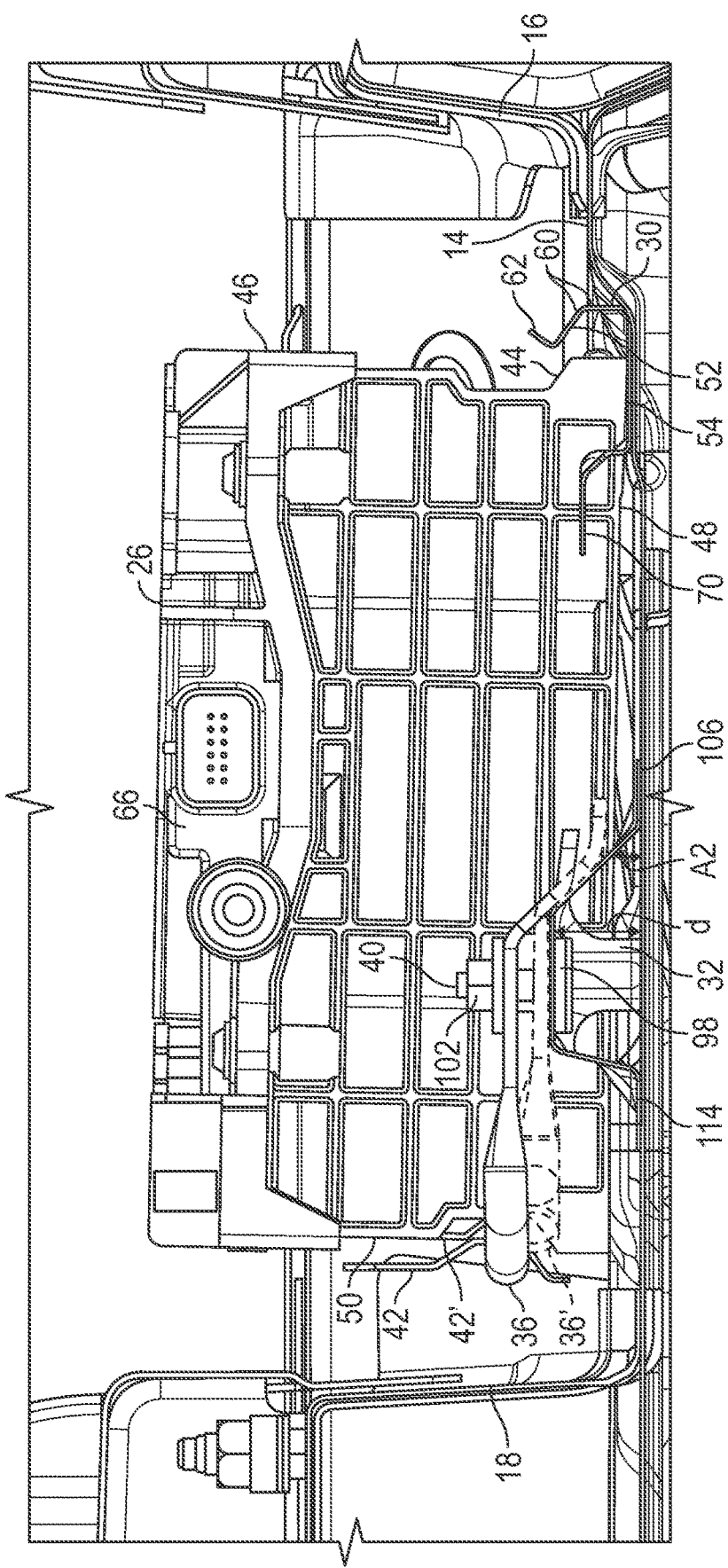
FIG. 5 illustrates a side view of a battery and a system for retaining a battery according to an exemplary embodiment, the dotted lines illustrate the movement of the retention rod relative to the side brackets.
Figure 7:
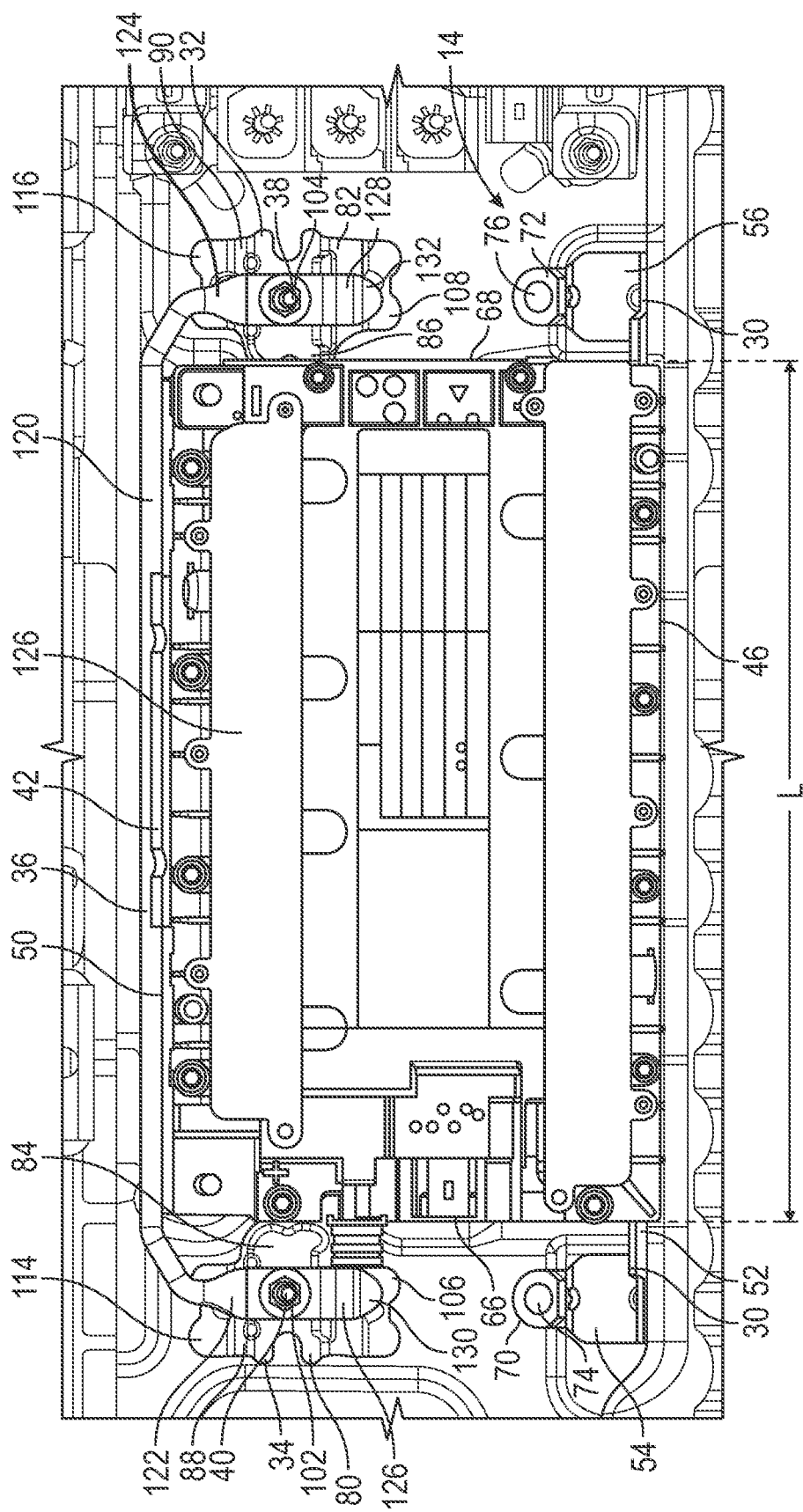
FIG. 7 illustrates a top view of a battery and a system for retaining a battery according to an exemplary embodiment.

Referring again to FIG. 3, the end portions 54, 56 of the retention clip 30 extend out from the main body 52 of the retention clip 30 and along either side 66, 68 of the battery 26 (as seen in FIGS. 5 and 7). In aspects, the retention clip 30 is tacked to the floorboard 14 at the end portions 54, 56. Additional tabs 55, 57 for tacking the retention clip to the floorboard 14 may also be provided and extend from the base of the main body. In further aspects, the end portions 54, 56 each include a raised tab 70, 72. In yet further aspects, each raised tab 70, 72 includes an opening 74, 76.

Turning now to the side brackets 32, 34, the side brackets 32, 34 are spaced between the front face 50 and rear side 46 of the battery 26. In the aspects illustrated in FIG. 5, the side brackets 32, 34 are spaced closer to the front face 50 of the battery 26 than the rear side 46 of the battery 26. Each side bracket 32, 34 includes a primary ramp 80, 82 and a secondary ramp 84, 86. The primary ramps 80, 82 face the retention clip 30 and, in aspects are oriented at an angle A2 in the range of 30 to 80 degrees relative to the floorboard 14, including all values and ranges therein, such as 40 to 60 degrees. The secondary ramps 84, 86 face each other and when the battery positioned on the floorboard 14, the secondary ramps 84, 86 face the sides 66, 68 of the battery 26, as seen in FIGS. 3 and 7. In aspects, the secondary ramps 84, 86 are also oriented an angle of 30 to 80 degrees relative to the floorboard 14, including all values and ranges therein, such as 40 to 60 degrees relative to the floorboard 14. Further, each side bracket 32, 34 includes a support leg 88, 90. In aspects, the side brackets 32, 34 are formed from a metal, metal alloy, or a polymer material.

The primary ramps 80, 82, secondary ramps 84, 86, and support legs 88, 90 support the upper surface 92, 94 of each side bracket 32, 34 spaced a distance "d" from the floorboard 14. Extending up from each side bracket 32, 34 is a portion of a mating mechanical fastener 38, 40. In aspects, the portion extending up from the upper surface 92, 94 is a bolt 98, 100, which mates with a nut 102, 104. In additional aspects, the bolt 98, 100 is secured to the upper surface 92, 94 to prevent the bolt 98, 100 from rotating when the nut is threaded on. In aspects, the side brackets 32, 34 are tacked to the floorboard 14 at feet 106, 108, 110, 112, 114, 116 extending from the bottom of each ramp 80, 82, 84, 86 and leg 88, 90 (see also FIG. 3). Again, it may be appreciated that alternative mechanical fasteners may be used, such as clamps.

Figure 6:
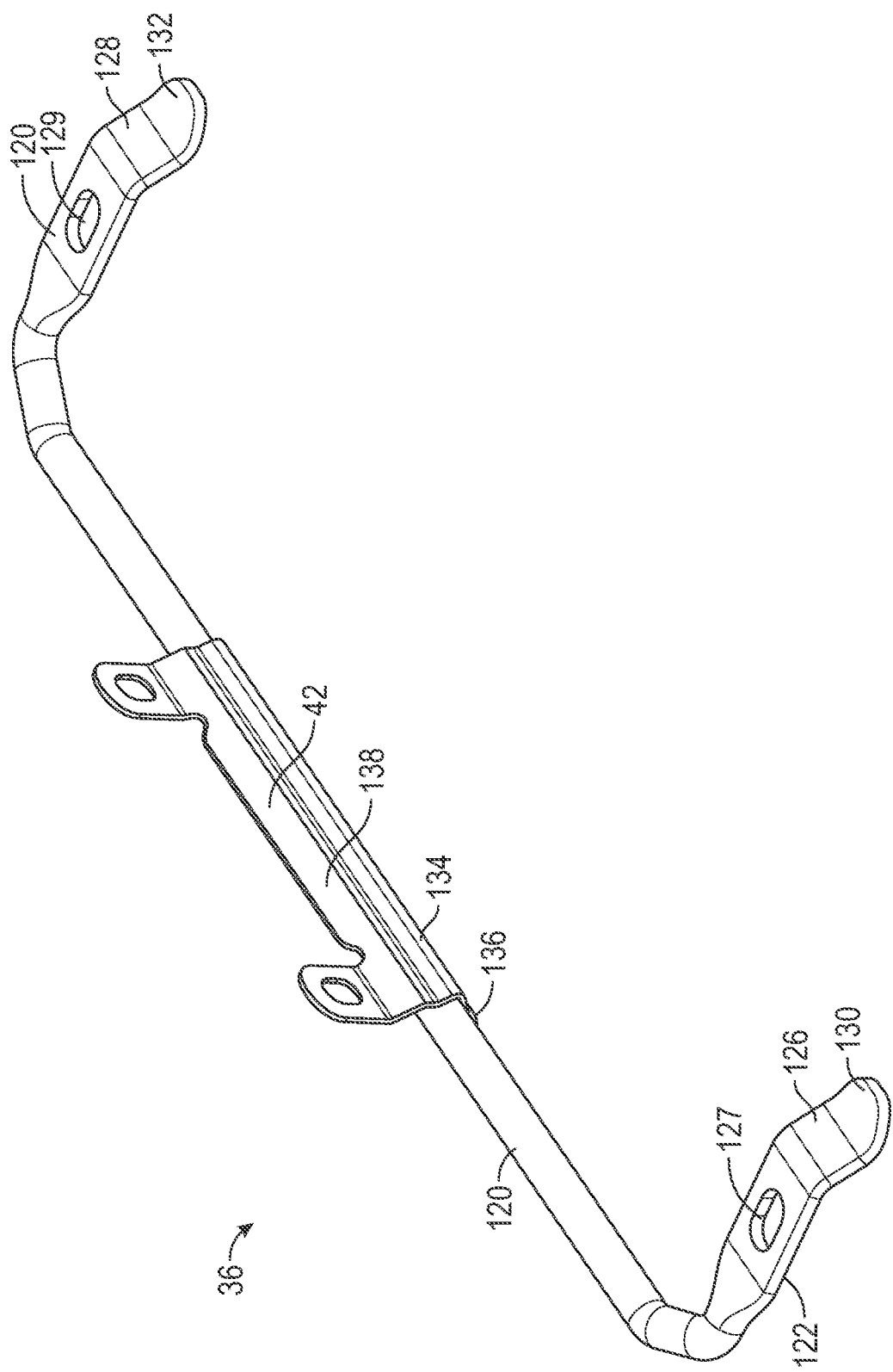
FIG. 6 illustrates a rear perspective view of a retention rod and a retention plate.

FIGS. 4 through 7 illustrate the retention rod 36. Turning to FIG. 6, in aspects, the retention rod 36 includes an elongated arm 120. The elongated arm 120 is a long as, or slightly longer than, the length L of the battery 26 (shown in FIG. 7). Extending from the ends of the elongate arm 120 is a first slotted arm 122 and a second slotted arm 124. The slotted arms 122, 124 each include a slide portion 126, 128 and connect the slide portions to the elongated arm 120. In the illustrated aspect shown in FIG. 5, the angle of the slide portion 126, 128 matches the angle of the primary ramps 80, 82. Further, each slide portion 126, 128 includes a tab 130, 132 extending therefrom. In aspects, the tabs 130, 132 are oriented parallel to the floorboard 14 or oriented within +1-15 degrees from parallel to the floorboard 14. The slotted arms 122, 124 also include slots 127, 129 defined therein for accommodating the mechanical fastener 38, 40.

In aspects, as illustrated in FIG. 6, a retention plate 42 is provided and may be affixed to the retention rod 36. The retention plate 42 is held between the retention rod 36 and the front face 50 of the battery 26 as shown in FIGS. 4 and 5. Further, the front face 50 of the battery 26 defines a channel 132. The lower sloping surface of the channel 132 provides a front clamping surface 51. The retention plate 42 is formed into a channel 134, which at least partially engages the channel 132 in the front face 50 of the battery 26 during initial installation of the battery 26 and sliding of the battery 26 into the final position. In aspects, the retention plate 42 exhibits a geometry that compliments the geometry of the second clamping surface 51. In addition, the elongated arm 120 is at least partially or completely received in the channels 132. In further aspects, the retention plate 42 also includes wings 136, 138 extending from either side of the channel 134. The wings 136, 138 may contact the front face 50 of the battery 26 on either side of the battery channel 132 when the retention rod 36 is engaged to the battery 26 during initial installation of the retention rod 36 and sliding of the battery 26 into the final position. When assembled, the channel 134 in the retention plate 42 engages the clamping surface 51 as seen in FIG. 4. In aspects, the retention rod 36 and retention plate 42 are selected from a metal, metal alloy, or polymer material.

To assemble the system, the retention clip 30 and side brackets 32, 34 are attached to the floorboard 14 by, e.g., spot welding or mechanical fasteners. The battery 26 is placed on the floorboard 14 between the two side brackets 32, 34. The secondary ramps 84, 86, assist in guiding the battery 26 into place from side to side. The retention rod 36 is slid into place around the front face 50 and side faces 66, 68 of the battery 26. The slide portions 126, 128 of each slotted arm 122, 124 engages the primary ramped surfaces 80, 82 of each side bracket 32, 34. If a channel 132 is present in the front face 50 of the battery 26, then the elongate arm 120 of the retention rod 36 is aligned with the channel 132. Further, if a retention plate 42 is affixed to the retention rod 36, the channel 134 of the retention plate 42 is aligned with the channel 132 in the front face 50 of the battery 26.

As the nuts 102, 104 are threaded on the bolts 98, 100, the slide portions 126, 128 are drawn down the primary ramps 80, 82, moving the retention rod 36 closer to the retention clip 30. The retention rod 36 engages the clamping surface 51 of the front face 50 of the battery 26 as the battery 26 is drawn towards the retention clip 30. Once seated and installed, the clamping surface 44 of the battery 26 is engaged by the retention clip 30, as illustrated in FIGS. 4 and 5, and the retention rod 36 remains engaged with the clamping surface 51 of the front face 50. FIG. 5 illustrates, in broken line format, the location of the retention rod 36' and retention plate 42' after mechanically fastening the slotted arms 122, 124 of the retention rod 36 to the first and second brackets 32, 34. It is noted that, when assembled, the wings 136, 138 do not necessarily contact the battery 26.

A battery retention system and method of fastening a battery of the present disclosure offers several advantages. These include the ability to retain a battery without a retention strap that passes over the top of the battery. In addition, this includes the ability to retain a battery that does not include a retention surface that extends around the entire periphery of the battery base. Further, the battery retention device negates the need for a battery tray, which in aspects is omitted from the system.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery retention system, comprising:
   a retention surface;
   a retention clip connected to the retention surface;
   a first side bracket connected to the retention surface, wherein the first side bracket includes a first primary ramp facing the retention clip;
   a second side bracket connected to the retention surface, wherein the second side bracket includes a second primary ramp facing the retention clip;
   a retention rod including a first slide, a second slide, and an elongated member extending between the first slide and the second slide, wherein the first slide is configured to slidingly contact the first primary ramp and the second slide is configured to slidingly contact the second primary ramp;
   a first mechanical fastener configured to engage the first slide with the first side bracket; and
   a second mechanical fastener configured to engage the second slide with the second side bracket.

2. The battery retention system of claim 1, wherein the retention surface includes a floorboard.

3. The battery retention system of claim 1, wherein the floorboard is located in a vehicle.

4. The battery retention system of claim 1, further comprising a retention plate affixed to the elongated member.

5. The battery retention system of claim 1, wherein the retention rod includes a first slotted arm connecting the first slide to the retention rod and the retention rod includes a second slotted arm connecting the second slide to the second slotted arm, wherein the first slotted arm defines a first slot and the second slotted arm defines a second slot.

6. The battery retention system of claim 5, wherein the first mechanical fastener engages the first slot and the second mechanical fastener engages the second slot.

7. The battery retention system of claim 6, wherein the first side bracket includes a first upper surface spaced from the retention surface, wherein the first mechanical fastener extends from the first upper surface, and the second side bracket includes a second upper surface spaced from the retention surface, wherein the second mechanical fastener extends from the second upper surface.

8. The battery retention system of claim 1, wherein the first side bracket includes a first secondary ramp and the second side bracket includes a second secondary ramp, wherein the first secondary ramp faces the second secondary ramp.

9. The battery retention system of claim 1, wherein the retention clip includes a first end and a second end, and the first side bracket is located proximal to the first end and the second side bracket is located proximal to the second end.

10. A vehicle, comprising:
    a retention surface;
    a retention clip connected to the retention surface;
    a first side bracket connected to the retention surface, wherein the first side bracket includes a first primary ramp facing the retention clip;
    a second side bracket connected to the retention surface, wherein the second side bracket includes a secondary primary ramp facing the retention clip;
    a battery sitting on the retention surface between the first side bracket and the second side bracket, the battery including a clamping surface, engaged by the retention clip;
    a retention rod including
       a first slide, wherein the slide is configured to slidingly contact the first primary ramp,
       a second slide, wherein the second slide is configured to slidingly contact the second primary ramp,
       an elongated arm extending between the first slide and the second slide, wherein the elongated arm is positioned adjacent to the battery opposing the clamping surface;
    a first mechanical fastener configured to engage the first slide with the first side bracket; and
    a second mechanical fastener configured to engage the second slide with the second side bracket.

11. The vehicle of claim 10, wherein the retention surface is a floorboard.

12. The vehicle of claim 11, wherein the first side bracket includes a first upper surface and the second side bracket includes a second upper surface.

13. The vehicle of claim 12, wherein the first mechanical fastener extends from the first upper surface and the second mechanical fastener extends from the second upper surface.

14. The vehicle of claim 12, wherein the first side bracket includes a first secondary ramp, the second side bracket includes a second secondary ramp, and the first and second secondary ramps face the battery.

15. The vehicle of claim 10, further comprising a vehicle frame, a passenger compartment defined by the vehicle frame, and two cross-members spanning the passenger compartment wherein the battery sits between the at least-two cross-members.

16. The vehicle of claim 15, wherein a passenger seat is connected to the two cross-members and positioned over the battery.

17. The vehicle of claim 10, further comprising a retention plate retained between the elongated arm and the battery.

18. The vehicle of claim 17, wherein the battery includes an indent and the retention plate conforms to the indent of the battery.

19. A method of locating a battery in a vehicle, the method comprising:
    providing a retention surface, the retention surface including a retention clip connected to the retention surface, a first side bracket including a first primary ramp connected to the retention surface, and a second side bracket including a second primary ramp connected to the retention surface, placing a battery on the retention surface between the first side bracket and the second side bracket, the battery including a clamping surface located adjacent to the retention clip;

positioning a retention rod adjacent to the battery opposing the retention clip, wherein the retention rod includes a first slide and a second slide and the first slide is configured to slidingly contact the first primary ramp and the second slide is configured to slidingly contact the second primary ramp; and mechanically fastening the first slide to the first side bracket;

mechanically fastening the second slide to the second side bracket;

drawing the first slide down the first primary ramp;

drawing the second slide down the second primary ramp; and engaging the clamping surface with the retention clip.

20. The method of claim 19, wherein placing the battery on the retention surface includes locating the battery between the first side bracket and the second side bracket.

\* \* \* \* \*